United States Patent [19]

Fuesting et al.

[11] Patent Number: 5,490,393
[45] Date of Patent: Feb. 13, 1996

[54] GENERATOR ABSORBER HEAT EXCHANGER FOR AN AMMONIA/WATER ABSORPTION REFRIGERATION SYSTEM

[75] Inventors: Dale A. Fuesting, Newburgh; William E. Stephan, Evansville; Richard H. Merrick, Newburgh, all of Ind.

[73] Assignee: Robur Corporation, Evansville, Ind.

[21] Appl. No.: 220,299

[22] Filed: Mar. 31, 1994

[51] Int. Cl.$^6$ .................................................. F25B 15/00
[52] U.S. Cl. ................................. 62/101; 62/476; 62/484
[58] Field of Search ............................. 62/101, 103, 476, 62/484

[56] References Cited

U.S. PATENT DOCUMENTS

| | | | |
|---|---|---|---|
| 4,127,009 | 11/1978 | Phillips | 62/101 |
| 4,127,010 | 11/1978 | Phillips | 62/101 |
| 4,127,993 | 12/1978 | Phillips | 62/101 |
| 4,171,619 | 10/1979 | Clark | 62/2 |
| 4,193,268 | 3/1980 | Phillips | 62/101 |
| 4,207,751 | 6/1980 | Kampfenkel et al. | 62/141 |
| 4,209,364 | 6/1980 | Rothschild | 203/11 |
| 4,237,701 | 12/1980 | Holldorff | 62/476 |
| 4,246,761 | 1/1981 | Phillips et al. | 62/148 |
| 4,285,211 | 8/1981 | Clark | 62/335 |
| 4,299,093 | 11/1981 | Cohen et al. | 62/101 |
| 4,311,019 | 1/1982 | Rojey et al. | 62/101 |
| 4,329,851 | 5/1982 | Bourne | 62/101 |
| 4,337,625 | 7/1982 | Wilkinson | 62/79 |
| 4,383,416 | 5/1983 | Phillips | 62/101 |
| 4,410,134 | 10/1983 | Heimbach et al. | 237/2 B |
| 4,445,340 | 5/1984 | Reimann | 62/101 |
| 4,454,724 | 6/1984 | Erickson | 62/112 |
| 4,463,570 | 8/1984 | Kantner | 62/101 |
| 4,467,623 | 8/1984 | Reimann | 62/494 |
| 4,475,361 | 10/1984 | Alefeld | 62/476 |
| 4,476,694 | 10/1984 | Kunugi | 62/476 |
| 4,485,638 | 12/1984 | Reimann | 62/476 |
| 4,505,133 | 3/1985 | Malewski et al. | 62/476 |
| 4,526,009 | 7/1985 | van der Sluys et al. | 62/101 |
| 4,531,374 | 7/1985 | Alefeld | 62/79 |
| 4,534,180 | 8/1985 | Yasuda et al. | 62/141 |
| 4,542,628 | 9/1985 | Sarkisian et al. | 62/335 |
| 4,542,629 | 9/1985 | Biermann | 62/476 |
| 4,545,217 | 10/1985 | Nakao et al. | 62/476 |
| 4,546,620 | 10/1985 | Biermann | 62/476 |
| 4,563,295 | 1/1986 | Erickson | 252/69 |
| 4,567,736 | 2/1986 | van der Sluys et al. | 62/476 |
| 4,580,407 | 4/1986 | Aime et al. | 62/148 |
| 4,593,531 | 6/1986 | Fujimoto | 62/101 |
| 4,596,122 | 6/1986 | Kantner | 62/141 |
| 4,646,541 | 3/1987 | Reid, Jr. et al. | 62/476 |
| 4,665,711 | 5/1987 | Page | 62/238.3 |
| 4,691,525 | 9/1987 | Gelderloos | 62/101 |
| 4,691,532 | 9/1987 | Reid et al. | 62/476 |
| 4,706,464 | 11/1987 | Kreutmair | 62/101 |
| 4,718,243 | 1/1988 | Buschulte et al. | 62/101 |
| 4,719,767 | 1/1988 | Reid, Jr. et al. | 62/476 |
| 4,722,193 | 2/1988 | Purvis et al. | 62/81 |
| 4,724,679 | 2/1988 | Radermacher | 62/101 |
| 4,732,008 | 3/1988 | DeVault | 62/79 |
| 4,735,065 | 4/1988 | Vinz | 62/476 |
| 4,742,687 | 5/1988 | Reid et al. | 62/112 |
| 4,742,693 | 5/1988 | Reid, Jr. et al. | 62/476 |
| 4,763,488 | 8/1988 | Johnston | 62/497 |
| 4,770,005 | 9/1988 | Alefeld | 62/467 |
| 4,827,728 | 5/1989 | DeVault et al. | 62/79 |
| 4,894,998 | 1/1990 | Kaneko et al. | 62/148 |

(List continued on next page.)

*Primary Examiner*—Henry A. Bennet
*Assistant Examiner*—William C. Doerrler
*Attorney, Agent, or Firm*—Woodard, Emhardt, Naughton, Moriarty & McNett

[57] ABSTRACT

An absorption chiller having a generator absorber heat exchanger with a split device for directing a first portion of strong solution from the absorber to the generator at a first temperature, while simultaneously directing a second portion of strong solution from the absorber to the generator at a second temperature. The absorption chiller operates to transfer weak solution from the generator to the absorber at a temperature of about 265° F., while transferring strong solution from the absorber to the generator at two different temperatures—preferably about 210° F. and about 240° F.

12 Claims, 3 Drawing Sheets

U.S. PATENT DOCUMENTS

| | | | |
|---|---|---|---|
| 4,921,515 | 5/1990 | Dao | 62/335 |
| 4,926,659 | 5/1990 | Christensen et al. | 62/476 |
| 4,938,028 | 7/1990 | Murray | 62/108 |
| 4,966,007 | 10/1990 | Osborne | 62/101 |
| 4,966,014 | 10/1990 | Erickson | 62/235.1 |
| 4,967,566 | 11/1990 | Bergmann et al. | 62/101 |
| 5,016,444 | 5/1991 | Erickson | 62/79 |
| 5,024,063 | 6/1991 | Erickson | 62/101 |
| 5,033,274 | 7/1991 | Erickson | 62/476 |
| 5,038,574 | 8/1991 | Osborne | 62/101 |
| 5,050,392 | 9/1991 | Messmer et al. | 62/114 |
| 5,050,403 | 9/1991 | Maier-Laxhuber | 62/480 |
| 5,097,676 | 3/1992 | Erickson | 62/476 |
| 5,157,942 | 10/1992 | Dao | 62/476 |
| 5,255,528 | 10/1993 | Dao | 62/101 |
| 5,271,235 | 12/1993 | Phillips et al. | 62/101 |

GENERATOR ABSORBER HEAT EXCHANGER FOR AN AMMONIA/WATER ABSORPTION REFRIGERATION SYSTEM

FIELD OF THE INVENTION

The present invention relates generally to absorption refrigeration systems, and more particularly to an absorption refrigeration system having an economical and efficient generator-absorber heat exchange cycle.

BACKGROUND TO THE INVENTION

Absorption refrigeration systems are well known to the art. The basic principle of those systems is identical to that of the single-stage compression system except for the manner in which the pressure of the refrigerant vapor is increased to the level required for condensation. In particular, the compressor of the compression system is replaced by the absorber and the generator of the absorption system. Instead of compressing a low-pressure refrigerant vapor, it is first absorbed by a weak solution of the refrigerant and is thereafter pumped into a generator where it is heated. The heating process boils the refrigerant vapor from the solution and directs it, at high pressure, to the condenser.

Absorber heat exchange ("AHE") cycles are known to be useful in absorption refrigeration chillers. In principle, all AHE cycle absorption chillers exchange heat of absorption from the absorber to the generator—thereby reducing the amount of heat required by the generator. Typically, AHE equipment not only transfers the heat of absorption to the generator or to the strong solution before it enters the generator, but also takes advantage of the fact that the weak solution is already hotter than the strong solution which is formed, and additionally transfers some of that heat differential.

Generator absorber heat-exchange ("GAX") cycles are known to be an improvement to AHE cycle systems. In a GAX cycle machine, the heat of absorption is transferred at a temperature above the boiling point of the strong refrigerant solution, thereby maximizing the temperature overlap between the absorber and the generator and more efficiently transferring heat between the two components.

In both AHE and GAX cycle machines, heat transfer may occur by providing an additional heat-exchange pathway into the circuit followed by the refrigerant fluid, or it may be done by providing a separate work fluid in a separate circuit to transfer heat between the absorber and the generator. To briefly describe an absorption chiller with an integrated AHE pathway, a generator heats an absorbent solution, preferably ammonia/water, so as to release the refrigerant, ammonia in vapor form, from solution as previously described. The refrigerant vapor then passes through an analyzer to a rectifier and then to a condenser where it is condensed at a relatively high pressure by the ambient air or by fluids such as water or water/glycol mixtures. The condensed ammonia passes through a pressure reduction device and a refrigerant heat exchanger to an evaporator where the pressure is further reduced and the refrigerating effect is accomplished. The low pressure vapor then flows back through the refrigerant heat exchanger to a solution absorber heat exchanger where it comes into contact with a weak solution of refrigerant fluid flowing from the generator. In the absorber heat exchanger the weak solution absorbs a portion of the low pressure vapor with the resulting solution passing into an absorber cooled by ambient air or by fluids such as water or water/glycol mixtures. This results in the remaining ammonia vapor being absorbed in the absorbent solution. The strong solution thus formed passes through a solution pump, to help overcome the difference between the low pressure and the high pressure sides of the system, to the rectifier, the absorber heat exchanger and the generator, where the cycle repeats itself. This type of single effect cycle system has a fuel based system C.O.P. of approximately 0.5.

The generator absorber heat exchange cycle (GAX) operates at the two pressure levels of the single effect absorber heat exchange (AHE) cycle. The difference between the GAX cycle and the AHE cycle is that the GAX cycle recovers additional absorption heat from the high temperature end of the absorber and transfers it to the cooler low temperature end of the generator by generating vapor with the additional heat thereby reducing the heat input required from external sources. The temperature of the strong solution in the cold end of the generator must be such that the temperature of the weak solution in the hot end of the absorber is at a high enough temperature for heat transfer to occur in the GAX cycle. The greater the temperature overlap the greater amount of heat that can be transferred to the generator.

Although known GAX cycle absorption machines have acceptable efficiencies, they may be expensive to manufacture and operate. Particularly, many prior art GAX systems require an additional GAX pump and a second work fluid to transfer heat from the absorber to the generator. A need therefore exists for an economical GAX cycle absorption machine that does not require a second work fluid or its associated pump. The present invention addresses that need.

SUMMARY OF THE INVENTION

Briefly describing the present invention, there is provided an absorption machine having a GAX cycle that utilizes only the cycle fluids to transfer heat between a generator/absorber heat-exchanger and the generator at specific temperatures. The absorption machine includes a generator, a condenser, an evaporator and an absorber, with a refrigerant pathway operatively connecting the generator to the condenser, the condenser to the evaporator, and the evaporator to the absorber. A weak solution pathway from the generator to the absorber, and a strong solution pathway from the absorber to the generator are also included. A generator/absorber heat exchanger is simultaneously disposed in the strong solution pathway and the weak solution pathway, and includes means for splitting the strong solution pathway into a first subpathway and a second subpathway, wherein the first subpathway directs strong solution to the upper section of the analyzer/generator at a first temperature and concentration, while the second subpathway directs a two-phase mixture of strong solution and vapor to the bottom section of the analyzer/generator at a second temperature and concentration.

One object of the present invention is to provide an absorption machine having a GAX cycle that does not require secondary heat transfer fluids.

Another object of the present invention is to provide an absorption machine having a GAX cycle that does not require an additional heat transfer fluid pump.

A further object of the present invention is to provide an absorption machine with improved efficiency that is relatively inexpensive to manufacture and maintain.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

Briefly, the present invention relates to GAX cycle improvements by redesigning the absorber heat exchanger component of the generator absorber heat exchange cycle. The redesigned absorber heat exchanger still takes advantage of the temperature overlap between the hot end of the absorber and the cold end of the generator to recoup absorption heat at a higher temperature as in basic GAX cycles but does so without the use of an additional pump and separate heat transfer loop using a secondary heat transfer fluid.

Figure 1:
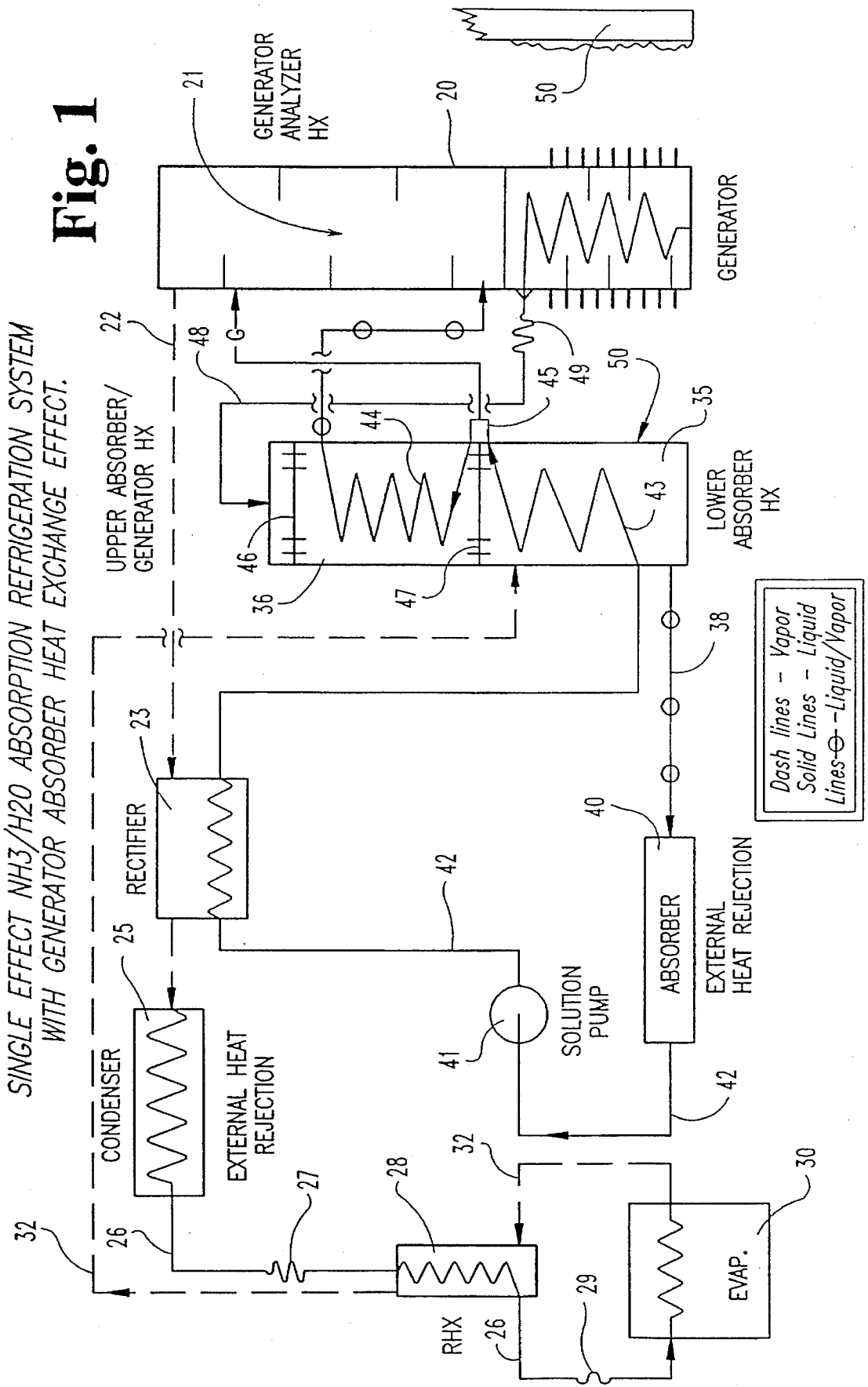
FIG. 1 is a schematic diagram of the GAX absorption machine of the present invention, according to one preferred embodiment.

In one embodiment of the present invention, as set forth in FIG. 1, a refrigerant vapor is generated in generator 20 and is routed through pathway 22 to condenser 25. Most preferably, the refrigerant vapor passes through analyzer 21 and rectifier 23 during that process. As is known to the art, analyzer 21 may be located at the upper end of generator 20, while rectifier 23 is located in pathway 22 and may be connected directly to the exit of analyzer 21.

In the condenser, the refrigerant vapor is condensed to refrigerant liquid in the traditional manner. After leaving condenser 25, the refrigerant liquid is directed to evaporator 30 through pathway 26. Pressure reduction means 27 and 29, and heat exchanger 28 are preferably located in pathway 26. In the evaporator, the refrigerant liquid is converted to refrigerant vapor and the cooling function is accomplished.

Upon leaving evaporator 30, the refrigerant vapor is directed through pathway 32 to lower absorber heat exchanger 35. Preferably, the vapor passes through heat exchanger 28 in that pathway. In lower absorber heat exchanger 35 and upper absorber generator heat exchanger 36 the refrigerant vapor contacts weak refrigerant solution (and is partially absorbed) before being routed through pathway 38 to absorber 40. In absorber 40 the weak refrigerant solution absorbs the remaining refrigerant vapor. The strong refrigerant solution thus formed is pumped by solution pump 41 through pathway 42 to lower absorber heat exchanger 35. Preferably, the strong solution passes through rectifier 23 as it is directed through pathway 42.

The strong solution passes through coil 43 in lower absorber heat exchanger 35 to splitting means 45. While in coil 43 the strong solution is in a heat exchange relationship with weak solution which surrounds it in lower absorber heat exchanger 35. Lower absorber heat exchanger 35 is sized to raise all the strong solution to the saturation temperature corresponding to the generator pressure. At splitting means 45 the strong solution is split into two portions, with a first portion being routed directly to the upper section of analyzer 21, and the second portion passing through coil 44 in upper absorber/generator heat exchanger 36. While in coil 44 the strong solution is in a heat exchange relationship with weak solution which surrounds it in upper absorber/generator heat exchanger 36. This portion of the strong solution becomes two-phased as its temperature rises and the solution concentration changes. After passing through upper absorber/generator heat exchanger 36, the second portion of strong solution is returned to the bottom of analyzer 21.

In generator 20 the first and second portions of strong solution combine. Weak solution is routed through pathway 48 to the top of upper absorber/generator heat exchanger 36, while refrigerant vapor is generated and routed toward condenser 25 to continue the cycle. Pressure reduction device 49 is preferably included in pathway 48.

Figure 2:
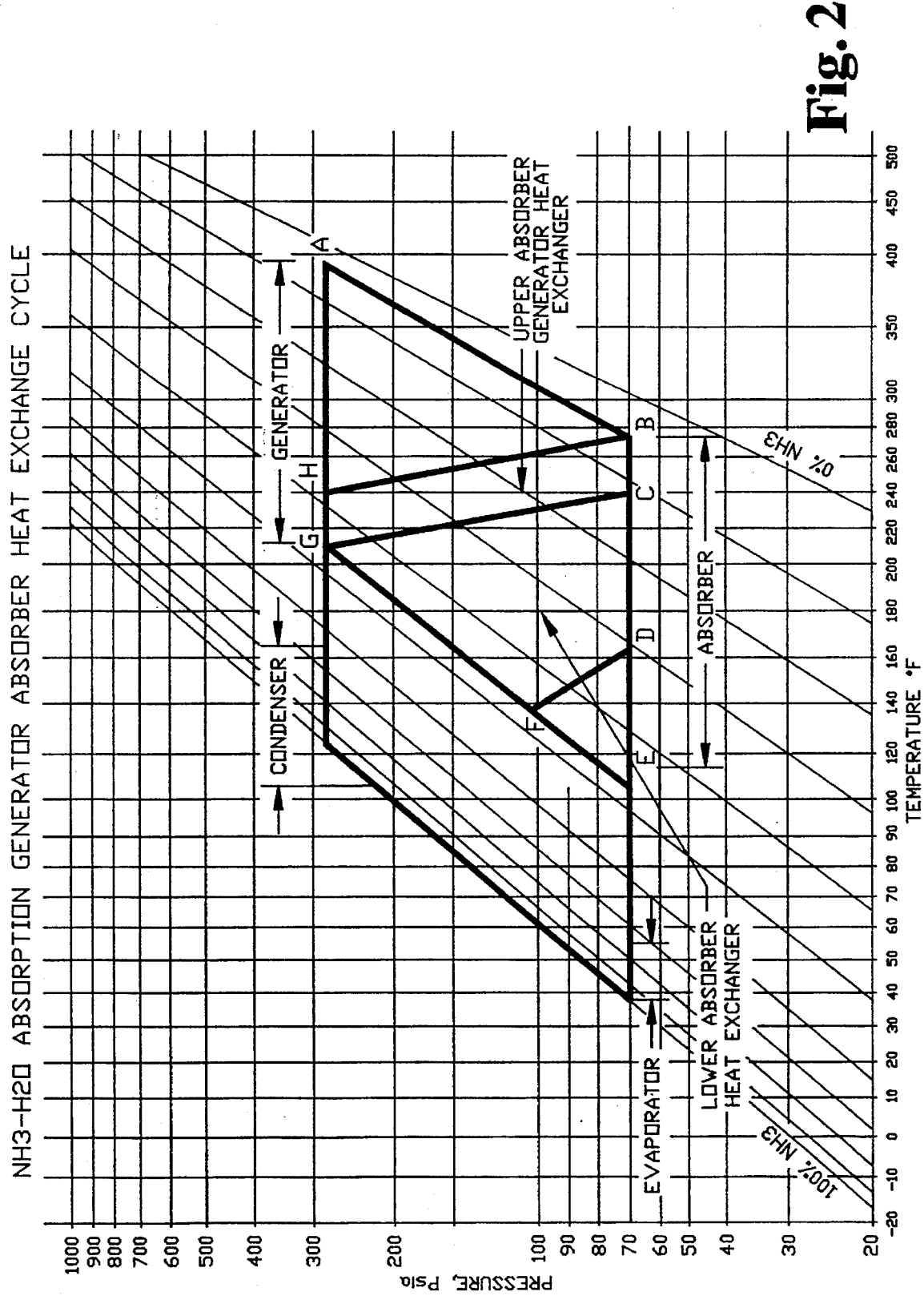
FIG. 2 is a temperature/pressure/composition diagram of the cycle of the GAX absorption machine of FIG. 1.
Figure 3:
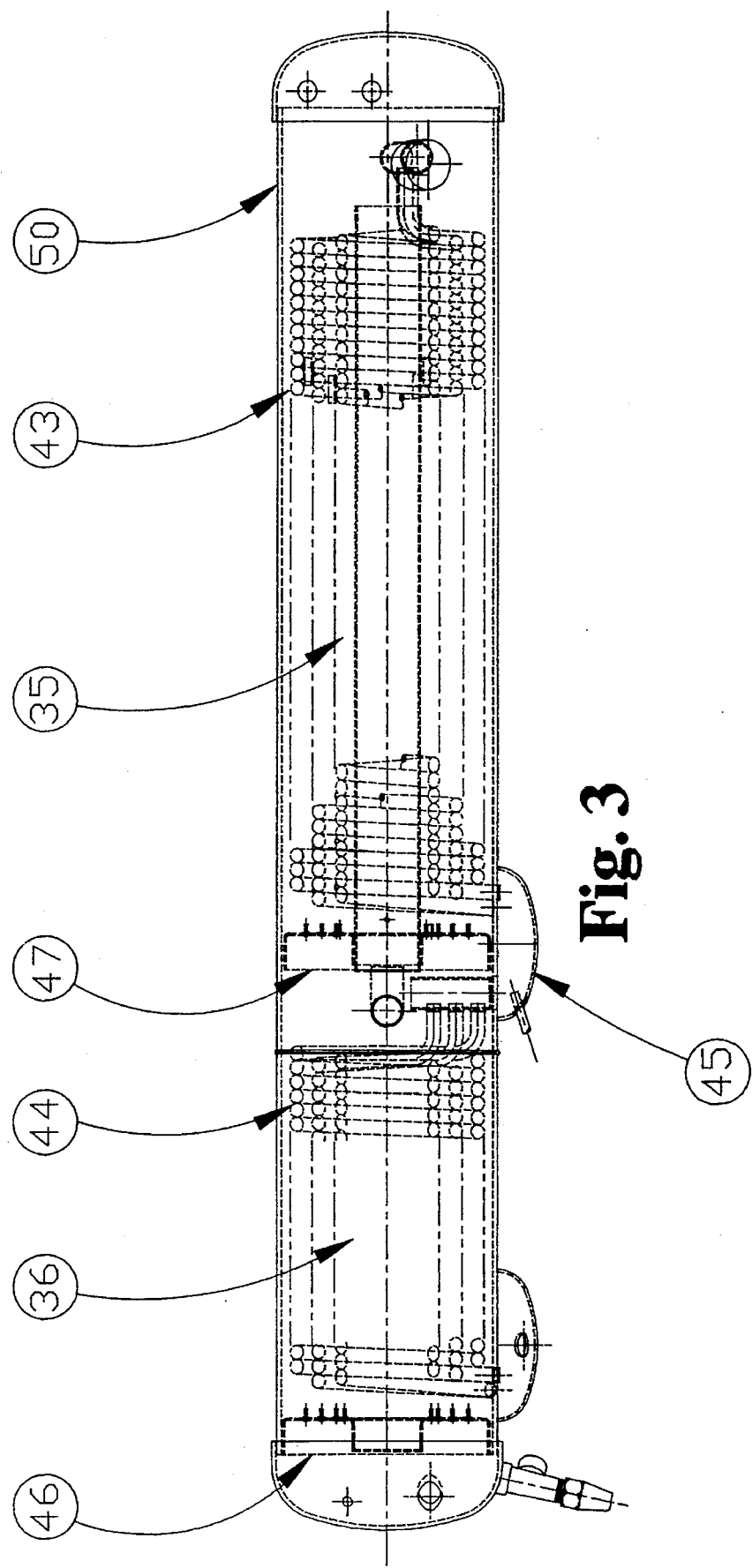
FIG. 3 is a side elevational view, in full section, of the generator/absorber heat-exchanger of the present invention, according to one preferred embodiment.

Representative temperature/pressure profiles of the fluid refrigerant are indicated on the pressure/temperature/composition diagram of FIG. 2. In general, the temperature range of the fluid in the generator is between 210° F. and 375° F., with a vertical temperature gradient being established. The lower section of the generator is heated, preferably by a gas flame burner 50. Most preferably, the gas burner extends vertically alongside the lower section of the generator, close enough to the generator to efficiently transfer heat.

Refrigerant vapor leaves the upper section of the analyzer at a temperature of about 220° F. After passing through the rectifier, the refrigerant vapor is at a temperature of about 165° F. In the condenser, the refrigerant is cooled to about 105° F. as is enters its liquid phase. The liquid refrigerant is cooled from about 105° F. to about 95° F. at pressure reduction means 27, and is further cooled to about 38° F. at pressure reduction means 29. The evaporative process raises the temperature of the refrigerant fluid to about 55° F. as the refrigerant reenters the vapor phase. After passing through heat exchanger 28 the refrigerant vapor is typically about 90° F.

The refrigerant vapor is heated from about 90° F. to about 162° F. in lower absorber heat exchanger 35. As the vapor and solution mixture is cooled in absorber 40 by a traditional manner to about 105° F. the vapor is adsorbed into the solution. After being pumped to and through rectifier 23 the strong solution is typically about 138° F.

The strong solution then enters the lower section of lower absorber heat exchanger 35 and is heated to about 210° F. before reaching splitting means 45. As previously indicated, a first portion (about 30%) of the strong solution is returned to the top of analyzer 21 at a temperature of about 210° F. The second portion (about 70%) is routed through the upper absorber/generator heat exchanger 36 where it becomes two-phased as it is heated to about 240° F. before being returned to the bottom of analyzer 21.

It is to be appreciated that the generator absorber heat exchange cycle (GAX) of the present invention includes a redesigned absorber heat exchanger. As indicated, the redesigned absorber heat exchanger still takes advantage of the temperature overlap between the hot end of the absorber and the cold end of the generator to recoup absorption heat at a higher temperature as in basic GAX cycles but does so without the use of an additional pump and separate heat transfer loop using a secondary heat transfer fluid.

In the present invention the generator/absorber heat exchanger now includes an upper absorber/generator heat exchanger and a lower absorber heat exchanger. The separate heat transfer loop in many prior art GAX cycles is replaced by the upper absorber/generator heat exchanger. With this arrangement, the strong solution return conduits to the primary generator must be routed so as to benefit from the concentration changes resulting from the absorption process taking place in the upper absorber/generator heat exchanger and lower absorber heat exchangers. With this arrangement and the adjustment of absorbent flow through the cycle, the achieved fuel based system C.O.P. increases to 0.62. This is an improvement in efficiency of approximately 30%.

It is further to be appreciated that the generator/absorber heat exchange cycle of the present invention reduces the flow of absorbent from the primary generator to the solution absorbers. This reduces heat loss by reducing the amount of solution circulated. Also, the amount of heat being returned to the primary generator through the weak solution conduit is increased due to absorption in the upper section of the generator/absorber heat exchanger.

It is also to be appreciated that the present invention returns heat to the cycle at locations in the primary generator where the heat can be of benefit. If the correct location in the primary generator is not chosen, cycle performance will be diminished.

The strong solution returns to the top of the analyzer at about 210° F. which is at or slightly above the saturation temperature for the strong solution concentration and the generator pressure. Any temperature above the solution's saturation temperature will increase the load on the rectifier and diminish the cycle performance. If the returning solution is below its saturation temperature, refrigerant vapor will be absorbed as it passes up through the solution. The absorption of refrigerant vapor decreases the amount of refrigerant available for use in the evaporator and diminishes cycle performance.

The two-phase strong solution returns to the bottom of the analyzer at about 240° F. and must enter the analyzer where the solution concentrations and temperature match that of the solution inside the analyzer. The temperature of the strong solution returning to the bottom of the analyzer is determined by the amount of the strong solution flowing through the upper absorber generator heat exchanger and the amount of refrigerant vapor absorbed by the weak solution in tile upper absorber/generator heat exchanger.

The present invention also provides that the weak solution leaves the generator at its saturation temperature for the pressure in the upper absorber/generator heat exchanger and its solution concentration before going through a pressure reduction device. If the solution were to exit the generator at a temperature above its saturation temperature, the solution would cool to its saturation temperature upon going through the pressure reduction device. In that event, the temperature reduction of the weak solution that happens at the pressure reduction device would have been lost, instead of being retained in the generator and used.

If the weak solution exits the generator at a temperature below its saturation temperature at the upper absorber/generator heat exchanger pressure for its solution concentration, the temperature of the weak solution will remain the same after the pressure reduction device. The temperature in the hot end of the absorber is reduced by the amount that the weak solution is below its saturation temperature causing a reduction in the temperature overlap between the hot end of the absorber and the cold end of the generator.

The upper absorber/generator heat exchanger acts as a generator. The strong solution releases vapor as it is heated by the weak solution which is absorbing refrigerant vapor. The strong solution in the lower absorber heat exchanger is also heated by the weak solution absorbing refrigerant vapor but does not exceed its saturation temperature and generate vapor.

It is also to be appreciated that the components required by the present invention are relatively simple and inexpensive to manufacture and maintain. As indicated, the system does not require a separate heat transfer loop to transfer the heat advantage gained in the upper absorber/generator heat exchanger. Construction of the generator/absorber heat exchanger requires only coiled tubing and means for distributing weak solution over the coils.

More fully describing the generator absorber heat exchanger apparatus itself, it is to be appreciated that the apparatus is similar in several respects to prior art absorber heat exchangers. That is, the unit comprises a housing containing a heat exchange coil, with a drip tray near the top of the unit. The refrigerant solution enters the top of the housing and flows onto the drip tray. The drip tray causes the refrigerant solution to cascade down over the heat exchange coils so that heat is transferred from the weak solution to the strong solution.

The present invention divides the apparatus into two sections— an upper absorber/generator heat exchanger section 36, and a lower absorber heat exchanger section 35. Drip trays 46 and 47 are positioned near the top of each section, two drip trays being appropriate for the two-section preferred embodiment. Similarly a coil is disposed in the unit, with a splitting means incorporated into the heat exchange pathway to split the strong solution into two portions. Before being split, both portions pass through lower absorber heat exchanger 35. As they leave the lower absorber heat exchanger, a first portion is directed through a first subpathway to the analyzer at a first temperature, preferably about 210° F. and a strong solution concentration, while a second portion is directed through a second subpathway through the upper absorber/generator heat exchanger to the bottom of the analyzer at a second temperature, preferably about 240° F. and a weaker concentration. In preferred embodiments the coil comprises a first coil 43 disposed in lower absorber heat exchanger 35, and second coil 44 disposed in upper absorber/generator heat exchanger 36. A housing 50 contains the unit.

Splitting means 45 may be any type of fitting, valve or orifice that performs the indicated function of splitting the flow of refrigerant solution. In the preferred embodiment, the splitting means consists of tubes orificed to have same pressure drop when the correct split of solution flow is achieved. The solution flow split is such that the quantity of strong solution returning to the top of the analyzer is sufficient to allow the analyzer to work correctly. If the flow is too low the rectifier load will increase diminishing cycle performance. If the flow to the top of the analyzer is too fast, the flow through the upper absorber/generator heat exchanger is too slow and will not allow the upper absorber/generator heat exchanger to recoup the maximum amount of absorption heat possible which diminishes cycle performance.

Finally, generator 20 may include analyzer 21 in the upper section thereof, or analyzer 21 may be separate from the generator. The lower section of generator 20 is filled primarily with weak solution and refrigerant vapor, with vapor and strong solution occupying the upper section of the generator, particularly the section including the analyzer.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected. For example, the improved GAX cycle of the present invention may be used in heat pumps, etc., as well as in the absorption chillers described as the preferred embodiment.

We claim:

1. An absorption machine having a single heat transfer loop and requiring only one heat transfer solution, said absorption machine comprising:

(a) a generator, a condenser, an evaporator and an absorber;

(b) a refrigerant pathway operatively connecting the generator to the condenser, the condenser to the evaporator, and the evaporator to the absorber;

(c) a weak solution pathway from the generator to the absorber;

(d) a strong solution pathway from the absorber to the generator; and (e) a generator/absorber heat exchanger simultaneously disposed in the strong solution pathway and the weak solution pathway;

wherein said strong solution pathway includes a first subpathway and a second subpathway, wherein the first subpathway directs strong solution to said generator at a first temperature and concentration, while the second subpathway directs strong solution to said generator at a second temperature and concentration; and further wherein said weak solution pathway routes weak solution through a first absorption step in said generator/absorber to a second absorption step in said absorber with substantially all of the weak solution that passes through said first absorption step being routed to said second absorption step.

2. The absorption machine of claim 1 wherein said generator/absorber heat exchanger includes an upper portion and a lower portion.

3. The absorption machine of claim 2 wherein said upper portion of said generator/absorber heat exchanger acts as a generator to generate refrigerant vapor, while said lower portion of said generator/absorber does not generate refrigerant vapor.

4. The absorption machine of claim 2 wherein said first subpathway avoids the upper portion of said generator/absorber heat exchanger.

5. The absorption machine of claim 2 wherein said second subpathway directs strong solution through the upper portion of said generator/absorber heat exchanger.

6. The absorption machine of claim 2 wherein the first subpathway routes strong solution to the upper portion of the analyzing section of the generator and the second subpathway routes strong solution to the lower portion of the analyzing section of the generator.

7. A method for improving the efficiency of an absorption machine, said absorption machine having a generator, a condenser, an evaporator and an absorber; said absorption machine further having a refrigerant pathway operatively connecting the generator to the condenser, the condenser to the evaporator, and the evaporator to the absorber; and said absorption machine further having a weak solution pathway from the generator to the absorber and a strong solution pathway from the absorber to the generator; said method comprising simultaneously including in the strong solution pathway and the weak solution pathway a generator absorber heat-exchanger, wherein said generator absorber heat-exchanger includes a splitting means to pass at least a portion of strong solution through the upper absorber/generator heat exchanger until that portion of the strong solution has been partially vaporized and heated to a temperature of about 240° F., and thereafter routing the two-phase strong solution to the generator.

8. The method of claim 7 wherein said splitting means additionally directs the remainder of strong solution to the the analyzer at its boiling point temperature of about 210° F., in a substantially liquid state.

9. The method of claim 7, and further including removing weak solution from the generator at a temperature of about 265° F., and routing said 265° F. weak solution to the upper section of the generator absorber heat exchanger.

10. A generator/absorber heat exchanger, comprising:

(a) an upper absorber/generator heat exchanger with:

(i) a first drip tray disposed near the top of the upper absorber/generator heat exchanger to cascade weak solution through the upper absorber/generator heat exchanger; and (ii) a first coil to pass strong solution through the upper absorber/generator heat exchanger in a heat exchange relationship with the showering weak solution;

(b) a lower absorber heat exchanger with:

(i) a second drip tray disposed near the top of the lower absorber heat exchanger to shower weak solution through the lower absorber heat exchanger; and (ii) a second coil to pass strong solution through the lower absorber heat exchanger in a heat exchange relationship with the showering weak solution;

(c) means for splitting the flow of strong solution so that a first portion of strong solution passes through the lower absorber heat exchanger and the upper absorber/generator heat exchanger until that portion of the strong solution is two-phased at a temperature of about 240° F., while a second portion of strong solution passes through the lower absorber heat exchanger reaching its boiling point temperature of about 210° F. but remaining in a substantially liquid state.

11. The generator/absorber heat exchanger of claim 10, and further including a housing to retain showering weak solution around the coils.

12. The generator/absorber heat exchanger of claim 10 wherein said means for splitting the flow of strong solution comprises tubes orificed to have the same pressure drop when a preselected split of solution flow is achieved.

\* \* \* \* \*